United States Patent [19]

Kauzlarich

[11] 3,781,071

[45] Dec. 25, 1973

[54] ELASTOHYDRODYNAMIC BEARING ASSEMBLY

[75] Inventor: James Joseph Kauzlarich, Charlottesville, Va.

[73] Assignee: Research Corporation, New York, N.Y.

[22] Filed: May 17, 1971

[21] Appl. No.: 143,943

[52] U.S. Cl. .................................. 308/9, 308/160
[51] Int. Cl. .......................... F16c 7/04, F16c 17/06
[58] Field of Search ...................... 308/9, 139, 140, 308/142, 143, 148, 149, 157, 160; 102/DIG. 3; 184/6.25

[56] References Cited
UNITED STATES PATENTS

| | | | |
|---|---|---|---|
| 3,626,510 | 12/1971 | Kauzlarich et al. | 308/9 X |
| 3,434,761 | 3/1969 | Marley | 308/9 |
| 1,293,165 | 2/1919 | Nainteau | 308/149 |
| 3,265,452 | 8/1966 | Pan et al. | 308/9 |
| 3,151,703 | 10/1964 | Benk | 184/6.25 |
| 3,635,534 | 1/1972 | Barnett | 308/160 X |
| 3,382,014 | 5/1968 | Marley | 308/160 X |

OTHER PUBLICATIONS

Brenner A., P. Burkhead and C. Jennings Physical Properties of Electroplated Chromium. U.S. Dept. of Commerce National Bureau of Standards Research Paper RP1854. Vol. 40, pp. 31 et al. Jan. 1948.

*Primary Examiner*—Benjamin A. Borchelt
*Assistant Examiner*—James M. Hanley
*Attorney*—Larson, Taylor & Hinds

[57] ABSTRACT

The invention discloses an elastohydrodynamic bearing assembly, with many configurations the simplest of which has a load supporting rotary shaft with a part-spherical tip supported in a pyramidal seat. An elastohydrodynamically compatible lubricant provides a thin film between the bearing surfaces. The seat provides multipoint self-aligning support and is elastically deformable; this, in conjunction with an increase in lubricant viscosity due to high operational pressures, enables the development of a satisfactory lubricant film in accordance with elastohydrodynamic lubrication theory.

8 Claims, 8 Drawing Figures

PATENTED DEC 25 1973

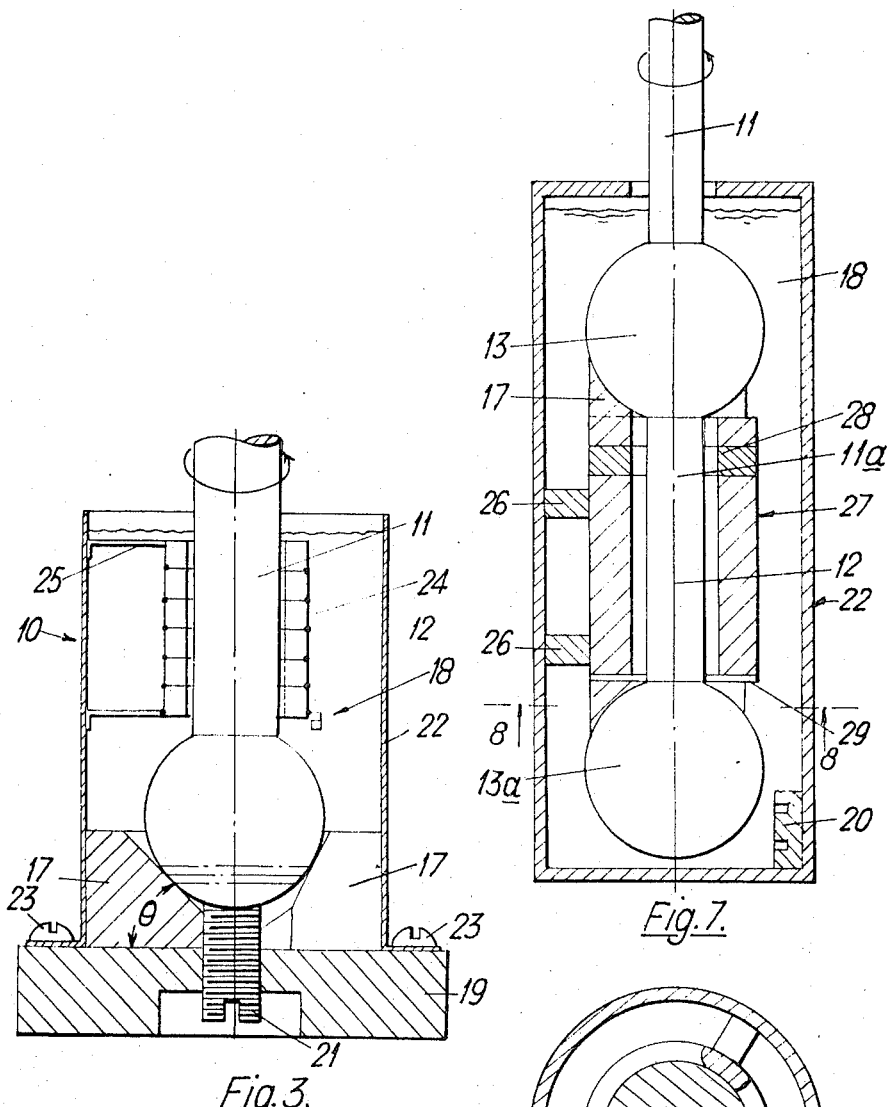
Fig.3.
Fig.7.
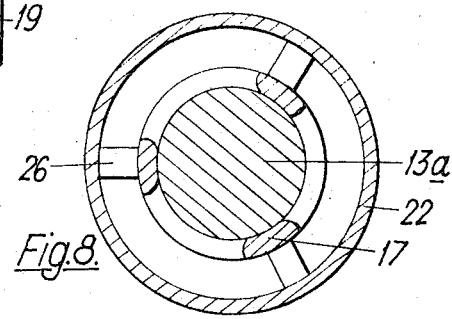
Fig.8.

ELASTOHYDRODYNAMIC BEARING ASSEMBLY

This invention concerns an elastohydrodynamic bearing assembly.

It has been discovered in recent years that many machine bearings and gears operate with a very thin but coherent liquid lubricant film the thickness of which lies, typically, in the range of 10–100 micro-inches. In these applications very high pressures are developed at the contact areas, and the pressures have an effect not only on lubricant viscosity, but also on the bounding solids around the film, hence this subject has become known as elastohydrodynamics.

Although this invention is not so restricted, particular reference will be made to the application of the invention to so-called pivot bearings, as encountered in instruments such as watches and gyroscopes. It has been found that e.g. pivot and endstone bearings always have a portion of zero radius of contact which will not aid the development of hydrodynamic lift; generally, their radius of contact is so small that they are unable to develop a lubricant film greater than the lapped and polished roughness of the contacting surfaces. In pivot and jewel bearings, when the pivot point comes into contact with the center of the jewel, the local film thickness is too small and wear will take place which will eventually lead to failure.

In high-speed devices other types of bearings have been tried, e.g. ball bearings, hydrostatic or hydrodynamic fluid bearings, magnetic or electrostatic suspensions etc. Most of these designs are rather expensive and complicated, and cannot in any case fulfil the crucial conditions for gyroscope applications, namely to allow the gimbal the desired degrees of rotational freedom with a low and predictable torque about the free axis and very high translational stiffness.

It is an object of the invention to seek to provide an improved bearing of great reliability, simplicity and economy of operation and which is substantially free of the above-mentioned drawbacks, thereby rendering it highly suitable for high speed and for high-load applications, such as gyroscopes. A subsidiary object of the invention is to provide such a bearing with an extremely well-defined rotational axis due to high bearing stiffness. A further object of the invention is to provide a self-aligning bearing operable with many common lubricants, with low vapor pressure lubricants in vacus, and with high boiling point lubricants at high temperatures. Yet another object of this invention is to provide an improved bearing having low toque requirements, capable of rotating in either angular direction, and possessing high axial as well as radial load capacity. Further, important objects of the invention are to provide a bearing which has a long service life due to absence (or substantially so) of any metal-to-metal contact in normal operation; which may be resiliently mounted for vibration damping; and which can be used, in conjunction with proper instrumentation, to evaluate lubricants for elastohydrohynamic applications.

With the foregoing objects in mind, this invention consists in an elastohydrodynamic bearing assembly for high-speed and high load applications, the assembly comprising a shaft, a shaped member secured to one end of said shaft, a highly polished, elastically deformable seat of high spring stiffness adapted to support said member to permit, in normal use, high speed relative rotation therebetween, an auxiliary means operative to support said member during starting-up and stopping only, means for immersing the seat and said member in a lubricant of high pressure co-efficient of viscosity and low shear degradation, whereby in high speed operation an elastohydrodynamic film of said lubricant of greatly increased viscosity is formed between said member and the elastically deformed seat.

Preferably, the said member has continuously arcuate, substantially uninterrupted bearing surfaces, the seat having a plurality of discrete, planar portions for providing said arcuate bearing surfaces with line-contact, self-aligning support, the plane of said planar portions being at an acute angle to the axis of said relative rotation.

Advantageously, the respective contact points between said planar portions and said member lie in different, spaced apart planes transverse to the axis of said relative rotation, the angular offset between the contact paths being preferably about 2° for a three-point support.

In a preferred mode of construction according to this invention, said shaft is in the form of a spindle carrying two of said members, a resiliently supported elongate body constituting said seat, at each end of said body there being a plurality of discrete planar supporting portions, the plane of each said portion being at an acute angle to the axis of said relative rotation, the respective contact points between said planar portions and each associated member lying on different, equally spaced apart planes transverse to the axis of said relative rotation, whereby to provide a multiple point, self-aligning support for the spindle.

The invention will now be described, merely by way of example and not of limitation, with reference to the accompanying diagrammatic drawings, wherein:-

FIG. 3 is a view corresponding to FIG. 2, but illustrating a modification;

FIG. 7 is a part-sectional, part-elevational view of a vertical spindle bearing according to a preferred embodiment of this invention, and FIG. 8 is a sectional view, taken along the line 8—8 in FIG. 7.

Like parts have been allotted the same reference numbers throughout the specification.

Figure 1:
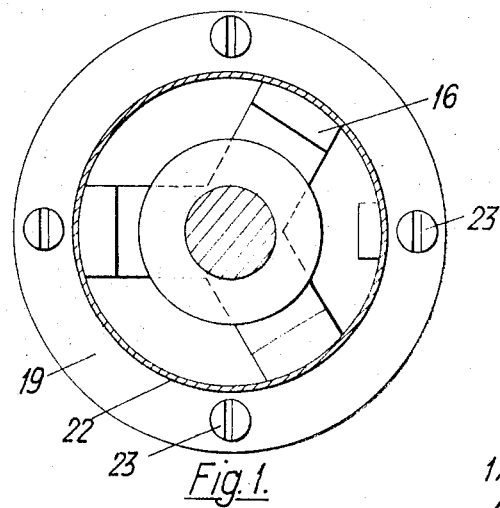
FIG. 1 is a transverse sectional view of a vertical pivot bearing according to one preferred embodiment of this invention.
Figure 2:
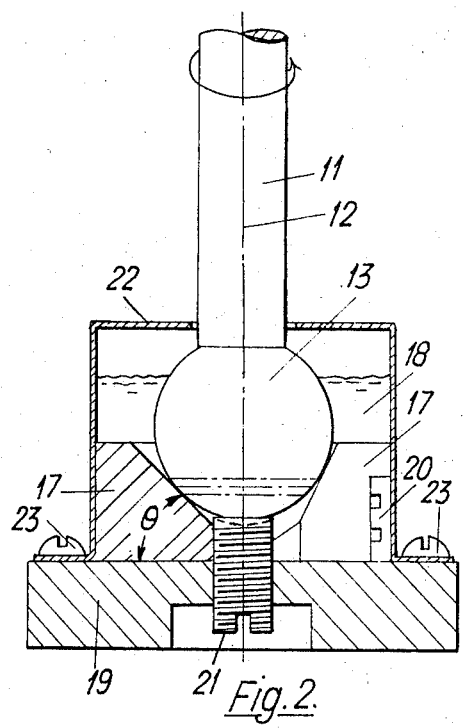
FIG. 2 is a part-sectional, part-elevational front view of the bearing shown in FIG. 1.

Referring first to FIGS. 1 and 2, there is shown a pivot bearing assembly 10 in accordance with this invention. The main elements of the assembly 10 are a vertical rotary shaft 11 rotatable about an axis 12 and having a part-spherical pivot tip 13 secured, e.g. by welding to its end shown in the drawings. The pivot tip 13 is journalled in a quasi-pyramidal seat 17 which in fact comprises three limbs or parts. As can be seen in FIG. 2, the supporting bearing surfaces of the seat are at an acute angle $\theta$ with the horizontal, and the angle $\theta$ differs by about 2° for each seat limb. In this way, the seat 17 provides a three-point, self-aligning support of high load capacity, due to the angular offset giving rise to three circular or elliptical separate contact paths, shown in chain-dotted lines, on the pivot-tip 13. This feature is highly advantageous for good heat transfer also. Of course, the number of support points may be varied. The preferred width of each limb is about 2 to 3 times the diameter of the contact path.

The pivot 11, 13 and seat 17 may be made from a large number of high strength, high spring stiffness materials, e.g. high strength steels, stainless steels, sintered carbides.

The pivot and seat are immersed in a lubricant 18. The lubricant chosen must have good elastohydrodynamic lubrication (EHL) properties of low shear degradation and high pressure coefficient of viscosity. The lubricant 18 may contain anti-wear and anti-scuff additives for protection during starting-up and stopping without affecting the design running performance of the bearing. Many mineral oils are very satisfactory EHL lubricants. For additional protection against scuffing, the bearing surfaces of the pivot and seat are provided with an electroplated deposit containing cobalt or rhenium.

To contain the lubricant 18, a housing 22 is arranged to surround and contain the seat 17, the pivot tip 13 as well as the lubricant. The housing 22 in FIG. 2 is of inverted U-shape in section, the base of which sealingly surrounds the pivot 11 adjacent the junction of the latter with the pivot tip 13. The housing 22 is secured to a base plate 19 by way of screws 23 (or equivalent fasteners) which pass through out-turned flanges of the housing 22. In this way, a lubricant chamber is formed. This chamber also contains a permanently magnetic collector 20 for collecting magnetisable particles, due to any wear or scuffing, from the lubricant. It will be noted that the lubricant is not circulated but is merely contained. However, continuous circulation of lubricant would also be feasible. To cool the lubricant, the housing 22 and base plate 19 will, of course, act as heat sinks, but the housing 22 may additionally be finned (not shown), if desired. The depth of lubricant is so predetermined or regulated as to avoid foaming or vortex formation at high rotational speeds.

Referring briefly to FIG. 3, the construction shown there is very similar to that of FIG. 2, but the housing 22 has greater vertical dimensions, as viewed. Surrounding the shaft 11 is a cylindrical screen member 24 adapted to act as a vortex shield and supported by struts 25.

As can be seen both in FIG. 2 and in FIG. 3, the pivot tip 13 rests initially on an auxiliary or starting seat 21. As shown, the seat 21 is in the form of an adjustable screw extending vertically along the axis of rotation 12 and projecting through the base plate 19 and between the limbs of the main seat 17. After suitable adjustment of the position of the screw 21, the shaft 11 may be rotated. The screw 21 will provide initial support. As long as the lubricant 18 touches the bottom of the rotating pivot tip 13, enough lubricant will be carried to the points of contact between the seat 17 and the pivot tip 13 by centrifugal force to develop a satisfactory EHL film, whereby a hydrodynamic lift will raise the pivot tip 13 off the screw 21. At normal running conditions. Hertzian high stress point or line contacts develop, the surfaces of the seat 17 will deform elastically, the viscosity of the lubricant 18 will rise greatly and metal-to-metal contact between the seat 17 and the pivot tip 13 substantially ceases. The load response, both axial and radial, is very rapid as the bearing has a very high spring stiffness, which also gives rise to an extremely well defined axis of rotation.

Since the fluid film is very thin, e.g. of the order of 10–100 micro-inches, the bearing surfaces of the pivot tips 13 and the seat 17 must be polished to a very low surface roughness, of the order of 1 to 5 micro-inches CLA. To obtain satisfactory concentric running, the out-of-roundness or eccentricity of the pivot tip 13 must also be very low, typically 1 to 5 micro-inches. It will also be appreciated that the bearing described is capable of rotating in either angular sense.

In a typical experimental test, a ¼-inch radius spherical pivot tip of about 100 micro-inches out-of-roundness and about 2 micro-inch CLA surface roughness (a commercial ball bearing) was rotated in a seat whose angle (see FIG. 2) was 45°, variations in $\theta$ for the different limbs 2°, and surface roughness about 2 micro-inches. The seat material was hardened tantalum tool steel. The lubricant was Shell Turbo-33 mineral oil. A low-voltage circuit was used to determine the presence or absence of metal-to-metal contact between the seat and the sphere. Bearing in mind the very experimental stage of the assembly, the feasibility of this invention was amply demonstrated: the bearing was able to carry up to 14 lbs. axial load at 5000 r.p.m. without any measurable metal-to-metal contact.

Figure 6:
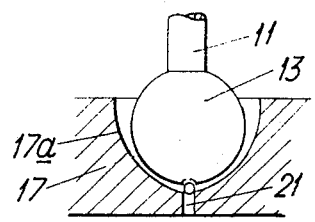
FIGS. 4, 5 and 6 are fragmentary, detail views of different pivot tip and seat configurations for bearings according to this invention.
Figure 4:
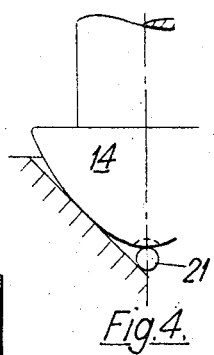
Figure 5:
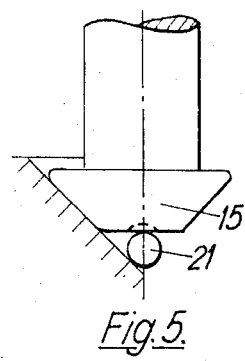

The configuration of the seat and pivot tip is not limited to the quasi-pyramidal and spherical. FIG. 4 shows a so-called barrel pivot in which the pivot tip 14 is continuously arcuate and symmetrical about the axis 12. FIG. 5 shows a so-called cone pivot, wherein the pivot tip 15 is substantially frusto-conical. FIG. 6 shows a spherical pivot tip 13 riding in a so-called conforming seat whose profile 17a is approximately barrel-shaped. In other words the profile 17a is continuously arcuate and symmetrical about the axis 12.

Referring now to FIGS. 7 and 8, the embodiment of this invention is shown applied to a spindle. The housing 22 is completely closed and carries, by way of a pair of spaced webs 26, a hollow, cylindrical support whose longitudinal axis of symmetry is coincident with the rotational axis 12. At each axial end of the support is mounted a quasi-pyramidal, conforming seat 17 substantially identical with the seat 17a of FIG. 6. The upper seat (as viewed) is secured to the support 27 by way of an annular elastic ring 28 which is provided for alignment purposes.

The lower seat 17 is connected to the support 27 by way of a piezoelectric oscillator or cell 29 for a purpose to be described below. The circuitry associated with the cell 29 is not shown.

Each seat 17 co-operates with, and journals, a substantially spherical pivot tip 13, 13a. The two tips 13, 13a are connected together by a shaft 11a, and the upper pivot tip 13 is connected to a spindle 11 projecting upwardly through the cover of the housing 22. Lubricant 18 is provided to a level near the cover so as to prevent foaming of, and vortex formation in, the lubricant. This latter is undesirable, for at higher speeds the fluid meniscus will dip downwardly along the rotary shaft or spindle 11 and air may then pass down along the dip. If this air were allowed to reach the contact points of the bearing, bearing failure will occur.

The piezoelectric cell 29 of this embodiment is the functional equivalent of the auxiliary means for starting-up and stopping of the preceding embodiments, viz. the screw 21. In initial operation, the cell 29 is vibrated, and its vibrations will afford lift and load support. Similarly, the cell 29 may be vibrated during stopping. In certain cases, the cell 29 may not be necessary.

It will be understood that the illustrated embodiments of this invention achieve, or substantially so, the objects of this invention and provide an elastohydrodynamic bearing highly suitable for high-speed, high-load applications, such as gyroscope pivot bearings.

It will further be understood that the above description with reference to the drawings has been given by way of illustration and not by way of limitation, in fact the constructions shown are capable of modification within the scope of the invention as claimed. Thus, as just one example of a modification, the bearing assembly herein disclosed is suitable not only for vertical shaft orientations but also oblique (tilted) and horizontal ones. It is then preferred to provide a seal between the shaft and the housing, this seal not being shown in the Figures.

I claim:

1. An elastohydrohynamic bearing assembly for high-speed and high load applications, the assembly comprising a shaft, a shaped member secured to one end of said shaft, a highly polished, elastically deformable seat of high spring stiffness adapted to support said member to permit, in normal use, high speed relative rotation therebetween, an auxiliary means operative to support said member during starting-up and stopping only, means for immersing the seat and said member in a lubricant of high pressure coefficient of viscosity and low shear degradation, whereby in high-speed operation an elastohydrodynamic film of said lubricant of greatly increased viscosity is formed between said member and the elastically deformed seat, wherein the said member has continuously arcuate, substantially uninterrupted bearing surfaces, the seat having a plurality of discrete, planar portions for providing said arcuate bearing surfaces with line-contact, self-aligning support, the plane of said planar portions being at an acute angle to the axis of said relative rotation.

2. A bearing assembly as claimed in claim 1 wherein the respective contact points between said planar portions and said member lie in different, spaced apart planes transverse to the axis of said relative rotation.

3. A bearing assembly as claimed in claim 2 wherein said member is substantially spherical, and the contact points between it and said planar portions are at different radii.

4. A bearing assembly as claimed in claim 2 wherein the spacing between said transverse planes is equal.

5. A bearing assembly as claimed in claim 1 wherein a vortex-preventing member is placed around the shaft adjacent said member.

6. A bearing assembly as claimed in claim 1 wherein said shaft is in the form of spindle carrying two of said members, a resiliently supported elongate body constituting said seat, at each end of said body there being a plurality of discrete planar supporting portions, the plane of each said portion being at an acute angle to the axis of said relative rotation, the respective contact points between said planar portions and each associated member lying on different, equally spaced apart planes transverse to the axis of said relative rotation, whereby to provide a multiple point, selfaligning support for the spindle.

7. A bearing assembly as claimed in claim 1 wherein said auxiliary means is a piezoelectric oscillator, the vibrations of the oscillator being capable of supporting load.

8. A bearing assembly as claimed in claim 1 wherein an anti-scuff electroplated deposit containing colbalt or rhenium is formed on the cooperating bearing surfaces of said member and said seat.

* * * * *